Aug. 16, 1966 L. L. SMITH ETAL 3,267,479

TELEVISION ANTENNA

Filed May 18, 1964 3 Sheets-Sheet 1

Inventors
LEONARD L. SMITH
RAYMOND ROBBINS
By Silverman + Cass
Attorneys

Inventors
LEONARD L. SMITH
RAYMOND ROBBINS
By Silverman + Cass
attorneys

TELEVISION ANTENNA

Inventors
LEONARD L. SMITH
RAYMOND ROBBINS
By Silverman & Cass
Attorneys 3,267,479
TELEVISION ANTENNA
Leonard L. Smith, Cave Springs, Ark., and Raymond Robbins, Lowell, Ark.
Filed May 18, 1964, Ser. No. 368,270
14 Claims. (Cl. 343—806)

This invention relates generally to high frequency antennas and more particularly is concerned with the construction of an antenna primarily intended for the reception of long distance television signals in so-called fringe or deep fringe areas where the distance from the receiving apparatus is substantially greater than those distances normally considered the range of a television receiving equipment with a good antenna.

In the reception of television signals in metropolitan areas where the greater number of broadcasting stations is concentrated in one fairly small location, it is usual for the television antenna in the surrounding territory to be fixed and pointed in the general direction of that location. The only adjustment required normally is one to minimize ghosts from nearby tall buildings, smokestacks, etc. In addition, almost any type of antenna will produce a sufficient signal to noise ratio to make reception satisfactory. Antennas of the so-called conical, Yagi, composite dipole, and many other different varieties are used. In less populated, or so-called fringe areas, television broadcasts originate in all directions and the mast supporting the television antenna in almost all cases is required to be mounted for rotation. Electrical storm disturbances may destroy satisfactory reception in one direction so that the antenna should be capable of rotation in a direction away from the storm to receive signals.

These considerations and several others dictate the requirements for a fringe area antenna, the provision of which forms an important object of this invention.

Presently, the principal television programs are broadcast upon channel in two bands designated "low" and consisting of channels 2 to 6 inclusive representing frequencies from 54 to 88 megacycles per second, and "high" consisting of channels 7 to 13 inclusive and representing signals of frequencies from 174 to 216 megacycles per second. A good fringe antenna must be capable of receiving all of these channels if not with uniform signal strength at least with sufficient signal strength to enable satisfactory reception.

A fringe area antenna is one which should produce at the receiving equipment electric currents having high signal-to-noise ratios for all channels. This perhaps should be expressed in a negative form since noise is produced by outside disturbances and inefficiencies of the antenna-receiver system, not usually by the antenna alone.

A good fringe area antenna, especially one which is to be used where the transmitting stations are great distances should be able to produce a strong signal in its driven elements and preferably should have driven elements resonating at the frequencies of the channels it is desired to receive. Moreover, the effect of the other elements upon the antenna for any given frequency should not be negative in character but preferably should be to improve gain.

An antenna for good fringe area reception should have high directivity and a high rear rejection coefficient, nor should there be any high gain lateral lobes in its pattern in addition to the forward lobe. Such lateral lobes can result in the reception of unwanted signals from side directions. Rear rejection is important especially where the receiving location will have stations operating on the same channel or multiple frequency channels in diametrically opposite directions and also it is important where one desires to receive signals in a direction opposite atmospheric disturbances.

Other essentials of the fringe area antenna are low cost, small volume and light weight and absence of complex structural members, and, quite important, a low resistance to wind.

An important object of this invention is to provide an antenna which meets all of the requirements of the fringe area antenna as set forth above and which will perform efficiently on all channels.

A further object of the invention is to provide an antenna which is especially intended to receive transmitted signals originating as much as 150 miles or more from the antenna and give excellent satisfactory pictures and sound from such signals.

Still a further object of the invention is to provide a television antenna for the reception of television signals in fringe areas which is formed of a plurality of extended oval driven dipole elements generally concentrically arranged in a horizontal plane mounted on a boom with suitable parasitic elements to provide the desirable characteristics referred to above.

Still a further object of the invention is to provide an antenna of the character described in which a novel driven element is provided as an extension of the smallest oval to give increased reliability of reception.

Another object of the invention is concerned with novel and simplified mechanical means for assembling the antenna in an economical and facile manner.

A further object of the invention is to provide an antenna of the character described which is sturdy and durable in addition to having low wind resistance.

Another object of the invention will occur to those skilled in the art as the description of a particular embodiment of the invention is set forth hereinafter in connection with which the drawings illustrate the same.

FIGS. 3, 4, 5, 6 and 7 are sectional views taken through the antenna generally along the lines 3—3, 4—4, 5—5, 6—6 and 7—7 respectively showing the general details of construction of the antenna.

Figure 1:
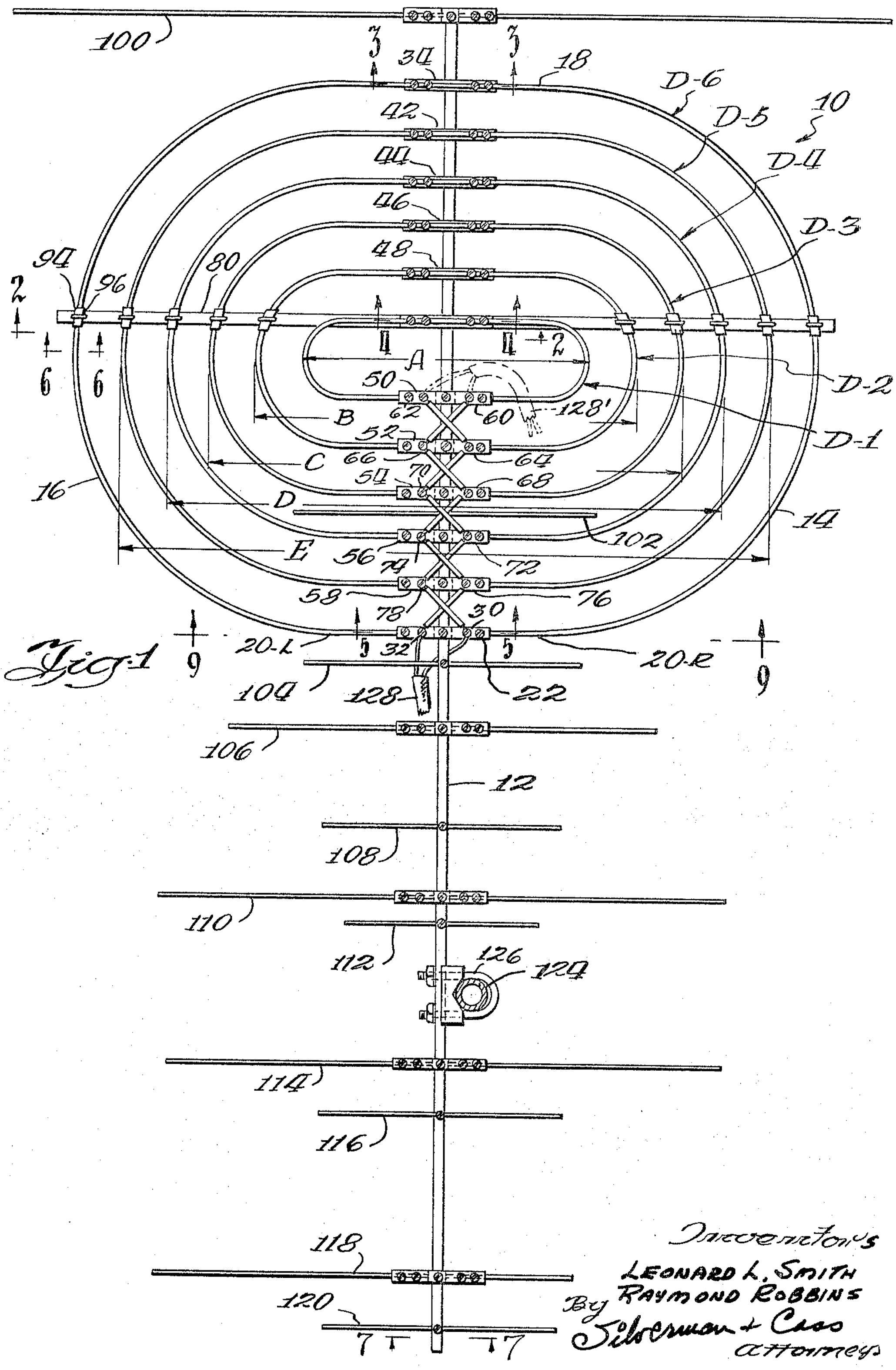
FIG. 1 is a top plan view of the television receiving antenna constructed in accordance with the invention showing the details thereof.
Figures 8, 9:
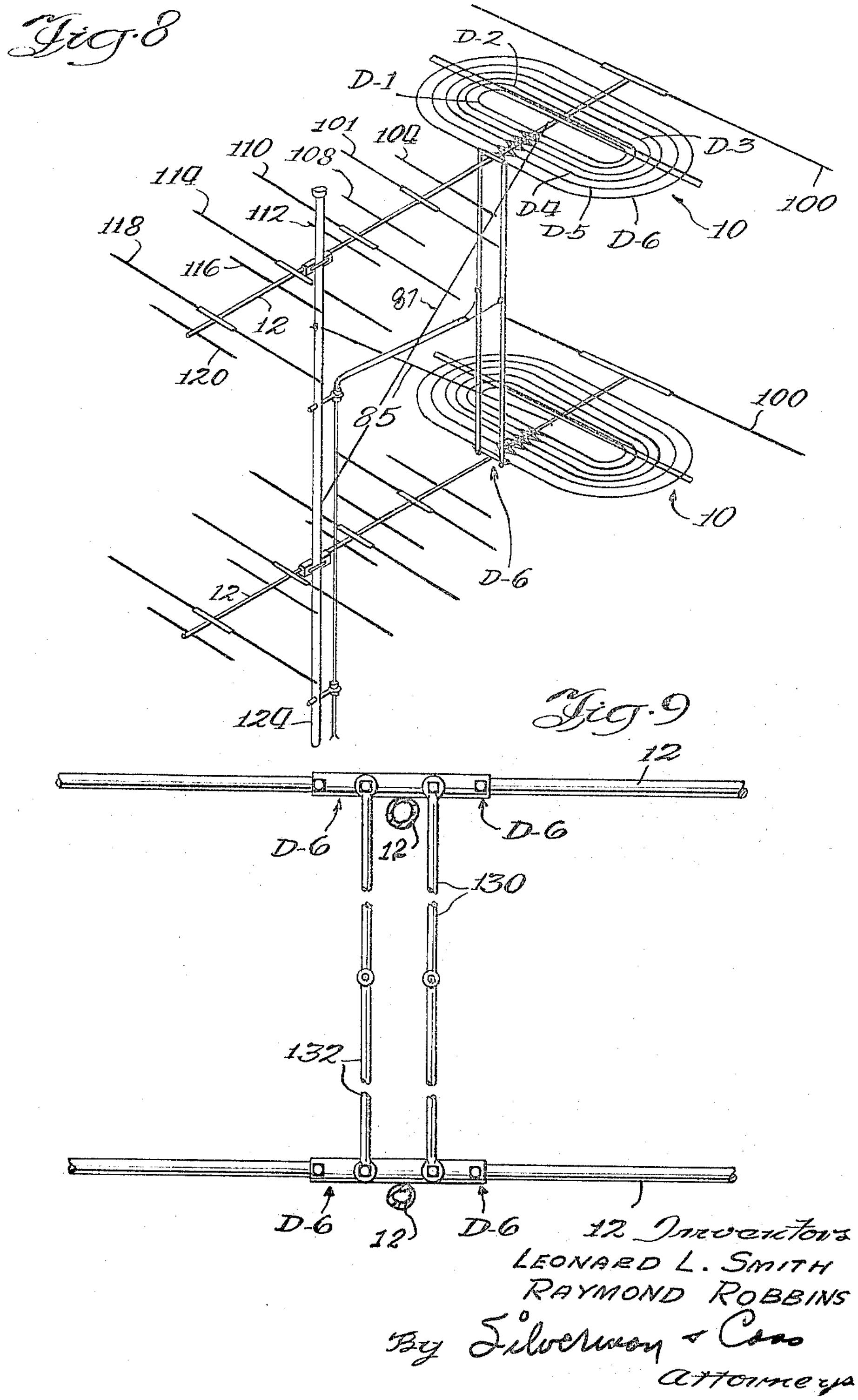

FIG. 8 is a perspective view showing an array consisting of two antennas of the construction of FIG. 1 mounted vertically on the same mast for improving the reception thereof, both antennas feeding a single receiver.

FIG. 9 is a detailed view of the electrical connections for the array of FIG. 8.

Generally, as indicated above, the antenna comprises an elongate boom mounted on a suitable mast which may be rotated by a rotating device and the boom having a plurality of driven dipole elements mounted thereon with suitable parasitic elements for improving the directional characteristics thereof. The dipole elements are generally capable of being described as elongate ovals each mounted in the same horizontal plane and increasing in size, the ovals being concentric relative to one another. The transmission line connects with each oval at the terminals thereof, but each of the dipoles is fed 180° out of phase with its adjacent neighbor. The result is a highly directional fringe area antenna capable of receiving signals on all channels. A bracing member for the ovals also functions as a modified extension of one of the ovals to improve reception.

As will be apparent from the detailed description to follow, a mathematical and comprehensive analysis of the operation of the antenna would be exceedingly complex, in view of the many parameters involved. Additionally, the arrangement of the driven dipoles is an unusual one so that the possibility of obtaining assistance from previous analyses of known arrays is remote. A theory of operation will be indicated hereinafter, but it is to be emphasized that this theory may not be valid. It is mentioned only in the interest of pointing out a possible basis for the unusual high gain, uni-directional directivity, and uniform response of the antenna on all channels.

It is believed that the antenna is a type of end-fire array of driven dipoles, and that its salutary characteristics derive from a novel manner of constructing the driven elements, arranging them with respect to one another and driving them. The advantages of physical compactness, low wind resistance, durability and simplicity in construction are collateral attributes flowing from the basic structure.

The antenna of the invention is shown in top plan view of FIG. 1, this being what may be termed a single bay, designated 10. In FIG. 8, a pair of antennas of identical configuration are stacked vertically, one on top of another to form two bays, conjointly driven for an increased response, etc.

The antenna elements are all mounted upon a horizontally extending boom 12 which preferably is formed of sturdy aluminum tubing. There are both parasitic elements and driven elements mounted on the boom 12, all of the parasitic elements being metallically connected to the boom at their centers and all of the driven elements being insulated from the boom. All of the elements are substantially in the same horizontal plane, the variation therefrom being occasioned by the physical problems of securement of the elements by means of fasteners.

The bottom end of the antenna 10 as viewed on the paper in FIG. 1 is the forward or front end of the antenna, while the upper end on the paper is the rear of the antenna.

The driven elements of the antenna are designated generally D–1, D–2, D–3, D–4, D–5 and D–6. The element D–1 has an auxiliary portion. Each of these elements is in the form of an elongate oval, having semicircular ends and straight sides arranged transversely of the boom 10, with the proportional ratio of length to width increasing inversely with size, so that the smallest element D–1 is in the form of an oval that is almost seven times longer than it is wide (measured along the length of the boom, hereinafter called "boom axis"), while the largest element D–6 is less than twice as long as it is wide.

Each of the driven elements is constructed in substantially the same manner, and hence a description of the details of one of these will suffice for all. Consider the driven element D–6 and the manner of its being mounted to the boom 12. The element is formed of aluminum tubing of any suitable gauge which is easy to bend and form and yet will retain its configuration if properly braced. The tubular member is formed into an integral oval having right and left semicircular ends 14 and 16 respectively, a straight side 18 which is continuous and an opposite straight side which is open at its center to provide the feed terminals for the element D–6. The open straight side may be designated 20–R and 20–L to distinguish its right and left free ends respectively as viewed in FIG. 1.

The free ends 20–R and 20–L are secured to the bottom side of a block 22 of insulating material which is clamped to the boom 12 by a suitable bolt 24 (FIG. 5) that passes through the boom and block and is fastened in place. Securement of the free ends 20–R and 20–L is afforded by bolts 26 and 28 respectively, these passing through the said ends and the block 22 so that the heads of the bolts are disposed on top of the block 22, thereby providing terminals 30 and 32 respectively for the securement of the transmission line, to be described. Obviously the bolts 26 and 28 must make metallic contact with the element D–6.

Figure 3:
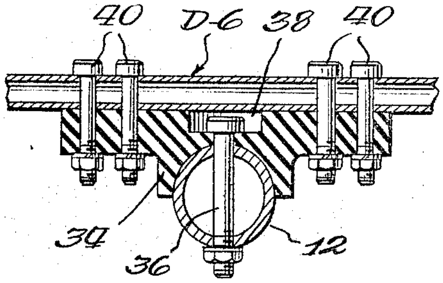
Figure 5:
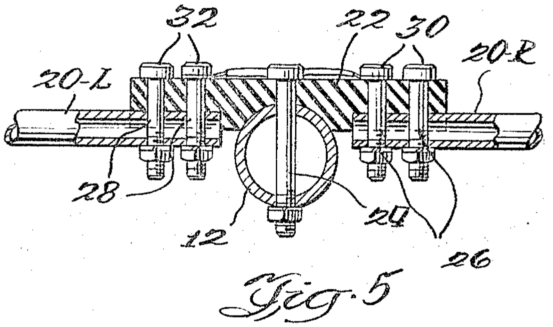
Figure 4:
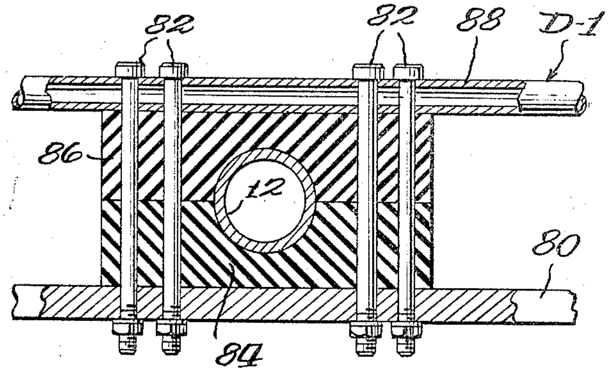
Figure 6:
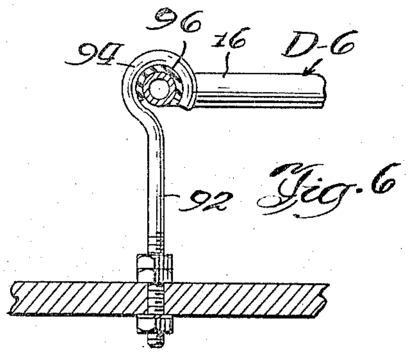

At the point that the straight side 18 crosses the boom 12 there is provided a bracket 34 which is shown in section in FIG. 3. The bracket 34 is in the form of a block of insulating material that is secured to the boom 12 by means of a bolt 36 passing through the bracket 34 and boom 12, there being a countersunk recess on the top of the block as shown at 38 so that the bolt head will not touch the element D–6. Fasteners in the form of suitable bolts 40 secure the element D–6 to the bracket 34.

In similar manner, each of the elements D–1 to D–5 inclusive is secured to the boom, there being a bracket similar to the bracket 34 for the straight side of the elements D–2, D–3, D–4 and D–5, these being designated 42, 44, 46 and 48 respectively. There is also a block similar to the block 22 for securing the free ends of the straight sides of the elements D–1 to D–5 these blocks being designated 50, 52, 54, 56 and 58 respectively. Terminals similar to 30 and 32 are provided for the free ends in the same manner, these terminals being designated 60 and 62, 64 and 66, 68 and 70, 72 and 74, and 76 and 78.

All of the elements D–1 through D–6 are supported at their approximate centers along their lengths by a member 80 which is of metal and is clamped to the boom 12 by elongate bolts 82 passing through insulating clamp halves 84 and 86 embracing the boom. The bolts also pass through the straight side 88 of the element D–1 so that the center support for that element is provided thereby. The element D–1 is insulated from the boom 12 but not from the member 80.

Obviously, the member 80 is an extension of the drive dipole D–1 and therefore may be considered a driven element itself.

Figure 2:
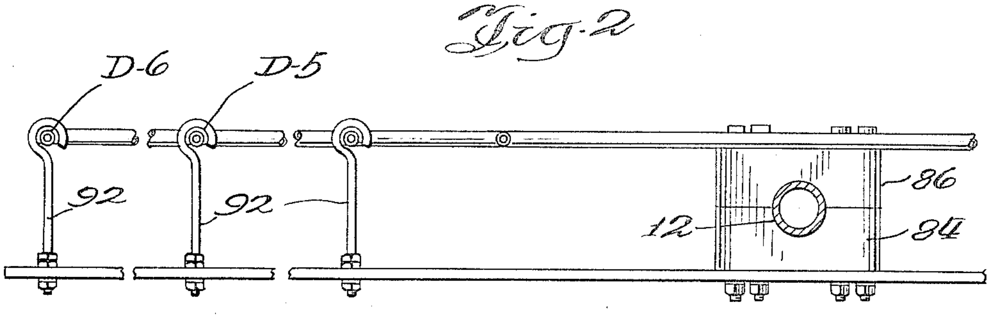
FIG. 2 is a sectional view taken generally on the line 2—2 of FIG. 1 in the direction indicated showing the lateral support member for the driven dipoles.

A vertically arranged stand-off support 92 is secured at a plurality of locations along the length of the member 80 at the points where the semi-circular ends of the respective driven elements D–2 to D–6 cross the same, there thus being ten such supports. Each support has an upper hook end 94 (see FIG. 6) which engages around a driven element. An insulating sleeve 96 prevents electrical engagement at this point. The arrangement is shown in FIG. 2 where several of these connections are illustrated in section.

Figure 7:
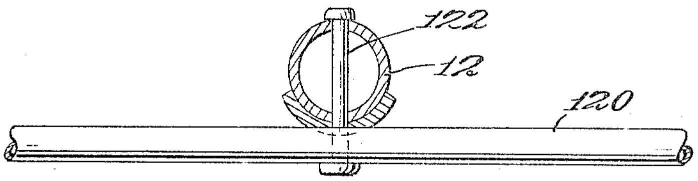

The parasitic elements of the antenna 10 are designated 100, 102, 104, 106, 108, 110, 112, 114, 116, 118 and 120, from top to bottom of the view in FIG. 1. These elements are connected to the boom by various kinds of brackets and fastening means which provide metallic contact at their centers. For example, a simple rivet or bolt 122 secures the element 120 as shown in FIG. 7.

The rearmost element 100 is a reflector whose length is substantially longer than the length of the largest driven element D–6, and hence it serves as such a director for all channels on both the high and low bands. The elements 102, 104, 108, 112, 116 and 120 are principally high band directors, operating on the Yagi principle, while the elements 106, 110, 114 and 118 are principally low band directors.

The boom 12 is supported by a suitable mast 124 which is secured to the boom by a clamp 126 at a balanced position along the boom. This would of course be closer to if not inside of the area subtended by the array of driven elements, but is shown away from this area for clarity.

Each of the driven elements has terminals, as explained, and a suitable twin lead transmission line 128 is connected to all of them, but in a particular manner as will be noted. The two conductors of the line 128 are connected to the terminals 30 and 32 respectively, of the element D–6, and from these terminals there are extensions of the conductors which are crossed to connect to the next set of terminals and so on. Thus, the conductor connected to terminal 30 extends to the terminals 78, 72, 70, 64 and 62 in that order, while the conductor connected with the terminal 32 extends to the terminals 76, 74, 68, 66 and 60. It will be obvious that the elements are connected 180° out of phase with one another. These crossed conductors are in effect an extension of the same transmission line 128 and hence will be considered merely as a part thereof.

Under certain circumstances the response of the antenna is better if the transmission line is connected to the terminals 60 and 62 as shown by the broken lines at 128' in FIG. 1.

The following table gives the dimensions of a practical and highly successful example of a television receiving antenna constructed in accordance with the invention. All of the dimensions are in inches. The lengths A, B, C, D, E and F are indicated in FIG. 1. All of the dimensions are approximate.

| Element | Length | Width | Circumference |
|---|---|---|---|
| D-1 | (A) 16½ | 2½ | 34 |
| D-2 | (B) 24½ | 7 | 56 |
| D-3 | (C) 34 | 17½ | 85 |
| D-4 | (D) 54 | 31 | 141 |
| D-5 | (E) 66 | 42½ | 177 |
| D-6 | (F) 78 | 51½ | 210 |
| 80 | 80 | -------- | -------- |
| 100 | 84 to 96 | -------- | -------- |
| 102 | 32 | -------- | -------- |
| 104 | 31 | -------- | -------- |
| 106 | 47 | -------- | -------- |
| 108 | 27 | -------- | -------- |
| 110 | 61 | -------- | -------- |
| 112 | 21 | -------- | -------- |
| 114 | 63 | -------- | -------- |
| 116 | 26 | -------- | -------- |
| 118 | 63 | -------- | -------- |
| 120 | 25 | -------- | -------- |

The distances between the parasitic elements is of the order of elongate composite antennas which are known and which use driven and parasitic elements along a boom. The distances between the sides of the driven elements on the other hand are quite small compared with the frequencies involved. The distances along the boom are listed below:

| | Inches |
|---|---|
| Director 100 to D-6 straight side | 8 |
| D-6 straight side to D-5 straight side | 4½ |
| D-5 D-4 | 7 |
| D-4 D-3 | 6 |
| D-3 D-2 | 5 |
| D-2 D-1 | 2½ |
| D-1 straight side to D-1 open side | 4½ |
| D-1 D-2 | 5½ |
| D-2 D-3 | 3½ |
| D-3 director 102 | 3½ |
| Director 102 to D-4 open side | 5 |
| D-4 D-5 | 5 |
| D-5 D-6 | 3 |
| D-6 open side to director 104 | 7 |
| Director 104 to director 106 | 7 |
| 106 108 | 10 |
| 108 110 | 7½ |
| 110 112 | 2½ |
| 112 114 | 15 |
| 114 116 | 5 |
| 116 118 | 18 |
| 118 120 | 6 |

It will be seen that the order of magnitude of the distances between the ovals of the driven elements is just a few inches. This is a small fraction of a wave length even for the high frequencies intended to be received.

As stated above, it is believed that the antenna 10, as for its driven elements comprises an end fire array. The well-known end fire antenna was classically made up of a plurality of driven elements arranged parallel one to the other and fed 180° out of phase. These elements were substantially closer to one another than half a wave length, and many studies of spacing showed that the closer spacing gave higher gain. The classic end fire array, however, was formed of a plurality of half wave dipoles spaced apart, the direction of maximum radiation being at right angle to the elements. It will be seen that according to the invention herein, the driven elements D-1 to D-6 are in effect dipoles spaced apart, but they are arranged within one another. Their separation is of the nature of the high gain end fire arrays, but not their arrangement.

Further, the ovals are in effect folded dipoles in which the straight side is spaced further apart than the ordinary folded dipoles. One effect of the ovals is to increase the input impedance to the order of 300 ohms so that ordinary transmission line can be matched to the antenna.

End fire antennas are known for having higher gain than most other arrays for a given space, and greatest directivity, so that the antenna 10 uses these attributes. The length of the driven element D-6 is somewhat less than half a wave length of channel 13, so that the width of the space occupied by the antenna is smaller than usual. Likewise, all of the other driven elements are within the element D-6, there being a separate element for each channel of the television spectrum. While it is believed that each of the driven elements resonates at one channel, the interloading effect provides a cooperative reenforcement of the signal, and all channels have substantially the same high gain. This effect is also believed to offset one of the principal disadvantages of the classical end-fire antenna, namely, that it tunes too sharply. Eliminating the sharpness of tuning increases the antenna stability, which decreases fading and the effects of aircraft in the vicinity. It is believed that the element 80 is responsible to a large measure for the increase in antenna stability for this precise reason—namely detuning of all elements. It was found that the presence of this element decreased aircraft and similar interference, thereby improving reception.

The parasitic elements concentrate the pattern of the antenna in the forward direction.

Two antennas may be stacked to provide the two-bay arrangement of FIG. 8. The distance between the antennas is of the order of 42 inches, and the antennas are connected in parallel to the transmission line 128. Cross bracing 85, 87 provides physical support for the antennas. Increased gain, directivity and rearward rejection is achieved. The antennas are driven by jumpers 130 and 132 connected to terminals 30 and 32 of upper and lower elements D-6. The line 128 is connected at the centers of the jumpers.

As previously mentioned, the theory of operation of the antenna is merely a suggested one. The structure described in the claims which are appended has been found to produce fringe area response not expected from a structure of this kind, and no limitations are intended because of the theoretical explanation. Modifications are possible within the purview of the invention as defined hereinafter.

What it is desired to secure by Letters Patent of the United States is:

1. A television reception antenna comprising a plurality of dipole elements of different sizes all arranged substantially in a horizontal plane, each element being of generally oval configuration with an opening in the oval in one long side to form a pair of dipole terminals, all of the ovals being concentric with all terminals on the same side, and means for connecting the terminals to a transmission line 180° out of phase with one another.

2. An antenna as claimed in claim 1 in which the antenna includes a plurality of directors and reflectors for providing unidirectional response for said antenna, said directors and reflectors being arranged parallel to the long axes of said ovals.

3. A television antenna as claimed in claim 1 in which the antennas are separated from one another by a small fraction of a wave length of the frequencies at which adjacent dipole elements are resonant.

4. A television antenna as claimed in claim 1 in which there is at least one pair of dipole elements whose circumferences are approximately one third of one another.

5. A television antenna as claimed in claim 1 in which half of said dipole elements are resonant at television frequencies of the low band and half at television frequencies of the high band.

6. A television antenna as claimed in claim 1 in which all of said ovals have the same axes.

7. A television antenna as claimed in claim 1 in which one of said dipole elements has an extension thereof electrically connected to the long side thereof and arranged parallel to the long axes of the ovals.

8. A television antenna as claimed in claim 1 in which one of said dipole elements has a rectilinear metal member electrically connected to its long side, of a length approximately that of the longest dipole element and inductively arranged relative to all dipole elements besides said one.

9. A composite broad band antenna having substantially uniform gain over two frequency ranges the approximate center frequency of the lower of which is a whole number multiple of the approximate center frequency of the higher, said antenna being highly directive along a horizontal axis and having a plurality of elements generally arranged in a horizontal plane and the elements being normal to said axis and symmetrically arranged on opposite sides thereof, comprising a metallic boom mounting said elements, said elements including a plurality of folded dipoles some of which are resonant at frequencies of one range and others of which are resonant at frequencies of the second range, each dipole being oval in configuration and all ovals lying in the same plane and having the same axis, means mounting all dipoles upon said boom insulated therefrom, and means for connecting a transmission line to all dipoles.

10. An antenna as claimed in claim 9 in which a bracing member is connected crosswise of the boom and insulated therefrom, and parallel with said axes, is electrically connected at its center with one dipole and insulatedly secured to and bracing all others.

11. An antenna as claimed in claim 9 in which said last means include terminals provided on each dipole and crossed interconnected conductors extending between terminals, so that adjacent dipoles are driven out of phase relative one another.

12. An antenna as claimed in claim 10 in which the bracing member is connected with a long side of the smallest oval and extends inductively across all others.

13. An antenna as claimed in claim 9 in which a parasitic element is mounted on the rear end of the boom and resonant to a frequency at most equal to the lowest frequency of the lower range, the folded dipoles are arranged next adjacent said parasitic element along said boom, and a plurality of parasitic elements resonant higher frequencies are spaced along said boom forward of said dipoles.

14. An antenna as claimed in claim 1 in which all ovals have a common axis, there are six of such ovals, the largest having a width which is approximately five-eighths of its length and the smallest having a width which is approximately one-sixth its length.

References Cited by the Examiner

UNITED STATES PATENTS

| | | | |
|---|---|---|---|
| 3,007,167 | 10/1961 | Winegard | 343—814 |
| 3,082,422 | 3/1963 | Watkins | 343—814 |
| 3,163,864 | 12/1964 | Greenberg | 343—810 |
| 3,202,995 | 8/1965 | Schultz | 343—732 |

HERMAN KARL SAALBACH, *Primary Examiner.*

R. F. HUNT, *Assistant Examiner.*